Oct. 13, 1953  W. A. GUNTHER  2,655,078
MECHANICAL STAGE FOR MICROSCOPES
Filed Jan. 9, 1952
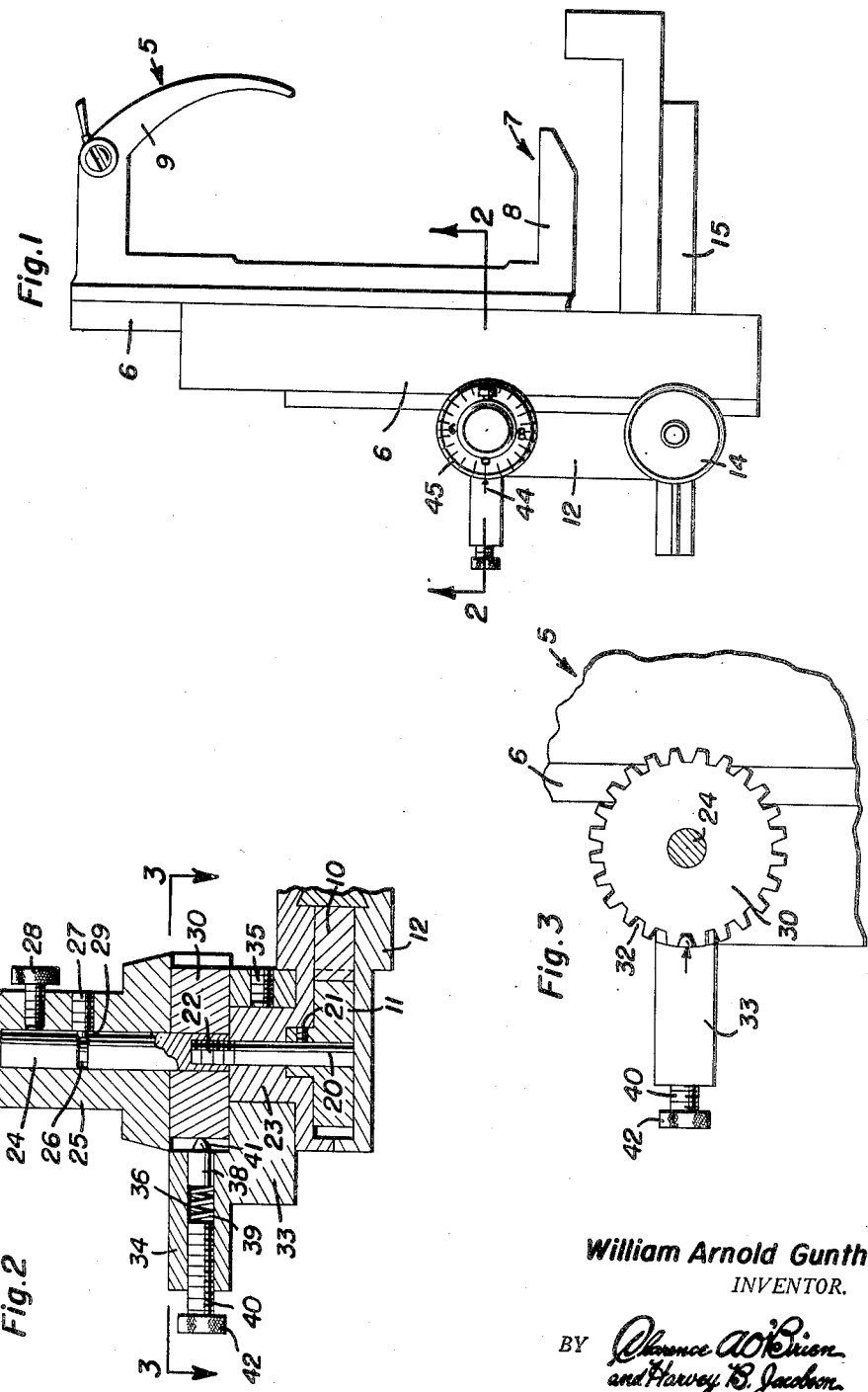
William Arnold Gunther
INVENTOR.
BY *Clarence A. O'Brien*
and *Harvey B. Jacobson*
Attorneys Patented Oct. 13, 1953

2,655,078

UNITED STATES PATENT OFFICE 2,655,078

MECHANICAL STAGE FOR MICROSCOPES

William Arnold Gunther, Cumberland, Md.

Application January 9, 1952, Serial No. 265,602

6 Claims. (Cl. 88—40)

This invention relates to improvements in mechanical stages for microscopes and it has for its general object to provide a mechanical stage with means for shifting the slide containing the specimen to be viewed which permit an exact advance of the slide through the viewing field of the microscope in such a manner that the area of successively observed fields covers exactly a given area of the specimen, said means simultaneously also registering the number of fields which have been inspected. The invention thus provides a useful aid for a quick and complete inspection of successively focussed fields and, in particular, it provides an aid for a quick and reliable computation of the number of microscopic objects, such as bacteria, blood cells and the like contained in a given area or in a given specimen.

The conventional mechanical stages used in connection with microscopes are provided with traversing means for moving a slide or a haematocytometer either in one or in two directions which means are provided in addition to those for moving the stage towards the lens and away from it for focussing purposes. The means for obtaining such movements must operate with great precision without play, vibration, or backlash and without too much friction in order to avoid a jumpy or abrupt action. When blood counts, bacteria counts and like operations have to be performed a specimen of the fluid which has to be inspected is prepared and the slide containing this specimen is then viewed, the cells or bacteria in each field of the specimen which comes into view being counted. For a quantitative evaluation of the result it is indispensable that a sufficient number of different fields be counted which should not overlap and that a record is kept not only of the number of cells or bacteria which has been found in each field but also of the number of fields in which the count has taken place. High precision and reliable results can only be obtained by counting the cells, bacteria and the like in field after field of a specimen, taking care that the fields do neither overlap nor that uninspected surfaces remain between the fields so that the count of the cells or bacteria merely extends over a given area of the specimen thus permitting to determine the number of cells, bacteria or other objects within a given volume or specimen area with a relatively very high accuracy.

Such a high precision count is therefore difficult to perform because the operator has not only to record at least two different sets of figures, but has also to pay attention to the shifting operation in order to place each viewing field on the specimen into a position in which it exactly adjoins the previously inspected field.

According to the invention the conventional knob for traversing the mechanical stage is replaced by a special mechanism which traverses the stage and the slide for a predetermined distance corresponding to one viewing field only, this mechanism comprising exchangeable members which permit to select the distance through which the slide is advanced in such a manner that it corresponds to the diameter of the lens, thus keeping the movement of the slide always in correspondence with the size of the field viewed by a given lens. The special mechanism limiting the traversing of one field exactly can then also be used to indicate or register the number of fields by means of graduation marks so that no special record of the number of fields in which the count has been made need be kept. The fact that the device automatically shifts the slide exactly from one field to the next field without any overlapping and without any intervening space and the fact that the number of fields is automatically registered relieves the operator from all activity which is not directly connected with the counting of the cells or bacteria and thus speeds the counting operation and reduces it to a mechanical operation which may be performed without eyestrain or special attention.

More specific objects of the invention will be apparent from the following detailed specification.

The invention is described with reference to the accompanying drawing illustrating one embodiment thereof. It is however to be understood that the embodiment shown in the drawing is shown by way of example only and that the construction described and illustrated has been selected in order to explain the principle of the invention and the best mode of applying said principle. This principle may be applied by means of other embodiments of the invention and a departure from the example which has been shown is therefore not necessarily a departure from the principle of the invention.

In the drawing:

Figure 1 is a plan view of a conventional mechanical stage with the improved mechanism according to the invention added.

Figure 2 is a sectional elevational view through part of the mechanism shown in Figure 1, the section being taken along the line 2—2 of Figure 1.

Figure 3 is a partly sectional plan view of a detail, the section being taken along line 3—3 of Figure 2.

The embodiment of the invention illustrated in the drawing is shown as being applied to a conventional mechanical stage 5 of a microscope which mechanical stage consists of a slide bar 6 forming part of the specimen holding frame 7 with a rigid and a resilient spring pressed arm 8 and 9 respectively. The slide bar 6 is provided with a rack 10 (Figure 2) which is attached to the slide bar and which meshes with the pinion 11 held within a support or mounting block 12. The knob and spindle for driving the pinion 11 which is used in the conventional constructions is replaced by the construction according to the invention which is described below.

The support or mounting block 12 is moreover also provided with a further knob 14 moving a pinion engaging a rack (not shown) which produces a transverse or crosswise movement of the slide carrying the specimen this movement being produced by means of a rail which is slidable along a guide piece 15.

The construction which has been described above is conventional and corresponds to the construction with which microscopes are usually equipped so that it need not be described further.

The improvement according to the invention is connected with the driving of the pinion 11. This pinion is secured on a spindle 20 by means of a set screw 21. The spindle 20 has a threaded end portion 22 which engages a threaded bore on a further spindle 24 carrying the operating knob 25. The two spindles 24 and 20 may also be made of one piece if suitable means for disassembling the parts and for securing the toothed wheel 11 on it upon insertion are provided.

To prevent an axial movement of the spindle assembly the spindle 24 is provided with a groove 26 into which a pin 29 enters which projects from a screw bolt 27 held in a threaded bore of the operating knob 25. The knob is fixed on the spindle 24 for rotation with the spindle by means of a thumb screw 28 which may be used to adjust the position of the knob on the spindle for a purpose set forth below.

The spindle 24 is fixedly connected with a notched or toothed wheel 30, the circumference of which is very accurately divided and contains a number of notches which is equal to or is a multiple of the number of viewing fields for a given length along the distance through which the slide is displaced by the stage. Preferably the advance of the slide holder 5 through one field by means of the rack 10 and the pinion 11 corresponds exactly to the angular movement of the wheel 30 for one notch or for one tooth or for a fixed number of notches.

The support member or mounting frame 12 is provided with a boss 23 and on the boss a further support 34 is mounted provided with a collar 33 surrounding the boss 23 and fixed thereon by means of a set screw 35. This support 34 is provided with a bore 36 the outer end of which is threaded and receives and engages the screw bolt 40 which is provided with a knurled knob 42. The screw bolt is applied against the spring 36 which on the other end bears against a cylindrical plunger 38 carrying a rounded locking pin 41 acting as a locking member engaging the notches 32 of the notched wheel 30. By adjusting the position of the screw bolt 40 the pressure applied against the plunger 38 and thereby the pressure with which the locking pin is forced into the notches of the wheel 30 may be adjusted.

The knob 25 is preferably provided with a graduation scale 45 which indicates the number of fields through which the slide carrying member 5 has been advanced. This graduation scale 45 may cooperate with a zero mark 44 and forms an indicator recording the number of fields through which the slide carrier has been moved and which have been inspected.

The operation when using the improved mechanical stage for microscopic work in which counting of cells, or of bacteria or the like in a specimen is practiced, for instance, when counting bacteria in a milk specimen or when counting blood cells in a haematocytometer, the operator first selects the notched wheel 30 the peripheral division of which corresponds to the diameter of the lens which he intends to use and he attaches the spindle 24 to the spindle 20 by screwing the threaded end of spindle 20 into the bore of spindle 24 and then secures the knob 25 on the spindle by screwing down the screw 27 until the pin 29 enters the groove 26; he then, before adjusting the thumb screw 28, turns the knob so that the zero point of the graduation 45 is opposite the zero mark 44. The thumb screw may then be fixed. Before adjusting the knob the operator must of course have brought the slide carrier to the point at which the count starts. During the counting operation the operator has merely to turn the knob from step to step thereby turning the notched wheel 30 and pinion 11 which engages the rack and advances the slide carrier. The advance of the notched wheel is only possible by pressing back the locking pin 41 and the plunger 38 against the pressure of the spring 39. This is clearly felt when operating the knob as the locking pin enters into the notches one after the other. The advance of the wheel for one or more notches therefore clearly indicates to the operator that the next field is now in position. If in doubt the operator may consult the graduation marks.

The operator therefore has solely to count the bacteria or the blood cells in the sample which is under inspection and has merely to record the numbers corresponding to his count, but he has no longer to divert his attention to the advance itself to the overlapping of fields or to the passing up of uncounted areas and also to the number or position of the fields which were inspected. The number of fields may be read after the termination of the count on the graduation. The above device thus relieves the operator of all secondary activity permitting a concentration of his attention on the counting operation and speeding up the said counting operation while at the same time increasing the accuracy of the work done.

It will be clear that unessential parts of the construction may be changed and without in any way departing from the essence of the invention as defined by the annexed claims.

Having described the invention, what is claimed as new is:

1. A mechanical stage for microscopes with a slidable, slide holding frame and with traversing means, including a pinion and rack for shifting the said frame along a straight line, comprising a hand operated knob for operating said traversing means, a dividing, apportioning and indicating feeler device for dividing the slide area into continuous inspection fields, said device being coupled with the hand operated knob and with said traversing means, said device including a wheel with a notched periphery connected with the knob, the notches of the wheel periphery being angularly spaced to such an extent that the rotational movement of the wheel through an angle between notches traverses the slide exactly through a full field of vision completely inspectable in the microscope, a spring pressed floating plunger with a locking head applied against the wheel periphery, said plunger head alternatively dropping into the notches and being pressed back towards the wheel periphery during rotation of the knob and wheel, thus indicating by the sudden radial snapping movement of the floating piston by the increase and by its rotational resistance to the operator the exact extent of the rotational movement of the knob bringing successive inspection fields in such alignment and coordination before the microscope that the fields are exactly adjoining and their border lines neither overlap nor leave non-inspected areas between them.

2. The device as claimed in claim 1 comprising in addition means for adjusting the spring pressure on the floating piston, said means including a floating spring, a threaded bolt pressing against the floating spring, said bolt having an outwardly projecting head adapted to be manually advanced towards the floating spring, the end of the bolt thus forming the counter base for the said floating spring applied against said floating plunger.

3. A mechanical stage for microscopes as claimed in claim 1 wherein said knob is provided with a step counting graduation, cooperating with a zero mark for visibly registering the angular movement of the knob after the start of the operation, the number of fields corresponding to this angular movement and the corresponding advance of the slide frame.

4. A mechanical stage for microscopes with lenses of different power as claimed in claim 1 wherein the notched wheel is mounted on a separate shaft removably fixed to the drive shaft of the pinion, and wherein said knob is provided with means for fixing it removably to the said separate shaft, the latter together with the notched wheel being exchangeable to produce exact corrspondence between the angular advance of the notched wheel and the viewing field produced by the lens in use.

5. A mechanical stage for microscopes, comprising a slidable frame for holding the slide with the microscopic specimen, means for traversing the same, including a rack on said frame and a pinion, a drive shaft for said pinion, a notched wheel fixedly associated with said drive shaft, the notches of the notched wheel being distributed along the periphery of the wheel so that an angular movement of the notched wheel through a predetermined number of notches, corresponds exactly to the advance of the specimen slide through a viewing field of the microscope, a rotatable knob provided with a graduation scale connected with said drive shaft, the graduations on the knob cooperating with a fixed mark and indicating the number of viewing fields through which the specimen carrying frame has been advanced, the drive shaft for the pinion being subdivided, and one of the drive shaft sections being threaded at one end, a separate drive shaft section carrying the notched wheel, provided with a threaded bore engaged by the threaded end of the pinion drive shaft section, the drive shaft section for the notched wheel carrying the knob, and means for removably fixing said knob on said separate drive shaft.

6. A mechanical stage for microscopes as claimed in claim 5, wherein the separate drive shaft for the notched wheel is provided with means for preventing an axial displacement, said means including a groove in said drive shaft and a pin on said knob projecting into said groove.

WILLIAM ARNOLD GUNTHER.

References Cited in the file of this patent

UNITED STATES PATENTS

| Number | Name | Date |
|---|---|---|
| 439,189 | Roovers et al. | Oct. 28, 1890 |
| 2,148,908 | Lory | Feb. 28, 1939 |